United States Patent [19]

Hopperdietzel

[11] Patent Number: 4,911,878
[45] Date of Patent: Mar. 27, 1990

[54] METHOD FOR PRODUCING A BLOW-MOLDED BODY

[75] Inventor: Siegfried Hopperdietzel, Selb, Fed. Rep. of Germany

[73] Assignee: Rehau AG & Co., Rehau, Fed. Rep. of Germany

[21] Appl. No.: 242,317

[22] Filed: Sep. 9, 1988

[30] Foreign Application Priority Data

Sep. 11, 1987 [DE] Fed. Rep. of Germany ....... 3730488

[51] Int. Cl.$^4$ ............................................. B29C 49/20
[52] U.S. Cl. ...................................... 264/516; 264/515
[58] Field of Search ................................ 264/516, 515

[56] References Cited

U.S. PATENT DOCUMENTS

| | | | |
|---|---|---|---|
| 3,281,283 | 10/1966 | Ralph .................... | 264/516 |
| 3,424,623 | 1/1969 | Oakley et al. ............. | 264/516 |
| 3,655,849 | 4/1972 | Hayashi .................... | 264/516 |
| 3,919,373 | 11/1975 | Kormendi ................... | 264/516 |
| 3,954,369 | 5/1976 | Körmendi . | |
| 4,213,933 | 7/1980 | Cambio ..................... | 264/516 |
| 4,511,529 | 4/1985 | Fowles et al. .............. | 264/516 |

FOREIGN PATENT DOCUMENTS

| | | | |
|---|---|---|---|
| 0103832 | 3/1984 | European Pat. Off. . | |
| 53-30660 | 3/1978 | Japan . | |
| 55-11823 | 1/1980 | Japan ...................... | 264/516 |
| 55-11846 | 1/1980 | Japan ...................... | 264/516 |
| 55-25380 | 2/1980 | Japan ...................... | 264/516 |
| 58-1529 | 1/1983 | Japan ...................... | 264/516 |
| 59-120519 | 7/1984 | Japan ...................... | 264/516 |
| 60-236855 | 11/1985 | Japan ...................... | 264/516 |
| 61-40116 | 2/1986 | Japan ...................... | 264/516 |
| 61-69554 | 4/1986 | Japan ...................... | 264/516 |
| 61-76339 | 4/1986 | Japan ...................... | 264/516 |
| 2101520 | 1/1983 | United Kingdom .............. | 264/516 |
| 2201628A | 9/1988 | United Kingdom . | |

*Primary Examiner*—Jan H. Silbaugh
*Assistant Examiner*—Catherine Timm
*Attorney, Agent, or Firm*—Spencer & Frank

[57] ABSTRACT

A method for manufacturing a blow-molded body employs a two-part blow-mold. A tubular preform is introduced, with the material in a thermoplastic state, into the opened blow-mold halves, and a reinforcing element is supported inside the preform by a displaceable holding device. During closing of the blow-mold halves, pressure is exerted on the wall regions of the preform that are adjacent to the reinforcing element. This pressure results in a reduced cross section of the preform wall in the region of the reinforcing element, and thermoplastic material is displaced. The interior of the preform is subjected to a blowing-pressure no later than when the pressure is applied from the exterior, and the blowing pressure causes the preform to inflate inside the mold. The displaced material anchors the reinforcing element inside the blow-molded body, and preferably forms bridges which extend across the blow-molded body and which cover the sides of the reinforcing element. The reinforcing element may also be provided with passages into which displaced material enters to form further bridges.

1 Claim, 5 Drawing Sheets

METHOD FOR PRODUCING A BLOW-MOLDED BODY

BACKGROUND OF THE INVENTION

The present invention relates to a method of producing a blow-molded body by employing a two-part blow-mold, with a preform being introduced into the opened blow-mold halves in the form of a tube in which the material is in a thermoplastic state and, after the mold halves are closed, a defined blowing pressure is applied to the inner contours of the blow-mold. After cooling, the blow-molded body is removed from the opened blow-mold. Before the blowing step, when the blow-mold is still open, an insert disposed on a longitudinally movable holding device is inserted into the preform and, when the blow-mold is closed, this insert is connected with part of the inner walls of the preform.

Such a method is disclosed in European Patent Application No. 0,103,832. This publication describes the production of a fuel tank in a blow-molding process in which an insert, for example a stilling pot, is introduced during the blow-molding process. This stilling pot is held by a fork-like holding element when the tube-shaped preform descends while exiting from an extruder. At the end of the descent and before the mold halves are closed, a holding mandrel is pushed through the wall of the preform to take over the support of the stilling pot in the interior of the tube-shaped preform. The fork-shaped holding element is then retracted, with the blow-mold still open. During closing of the blow-mold halves, the bottom surface of the stilling pot is pressed by the holding mandrel, which is part of one of the two blow-mold halves against the associated inner wall region of the body being molded. The bottom surface of the stilling pot is provided with undercuts into which the thermoplastic material of the preform enters during the pressing process to fix the stilling pot against the inner wall of the body being molded.

With this prior art method, a mechanical connection of the stilling pot with the body being molded, i.e., with the fuel tank, by means of additional connecting means is avoided. Such a mechanical connection always has the drawback that openings have to be made in the walls of the fuel tank in some way and these openings may lead to leakage during is subsequent use. However, the opening in the wall of the finished fuel tank produced according to the prior art method and mandated by the holding mandrel can be use for connection of the sensor for the fuel tank content indicator.

The drawback of the prior art method is the complicated mechanism, which initially involves the mounting of the stilling pot by way of the fork-like holding element during the extrusion process. After introduction of the holding mandrel, this fork-like holding element must be removed from its seat before the blow-mold halves can be closed. Then, finally, the holding mandrel itself, which is articulated to a molded piece in the stilling pot, must be removed from the finished fuel tank when the blow-mold halves are opened. Moreover the prior art method does not provide any possible solution for reinforcing a blow-molded body.

SUMMARY OF THE INVENTION

The object of the present invention is to provide a method for making a blow-molded body which, without the use of mechanical or other fastening means, is provided with reinforcing elements in defined regions of its interior, these reinforcing elements being immovably held in the position in which they are located when the preform is inflated. According to the present invention, during closing of the blow-mold halve an external pressure is exerted onto those wall region of the preform which are adjacent the reinforcing element so as to reduce the wall cross section and, no later than with the onset of this external pressure, the interior of the preform is charged with the blowing pressure.

Compared to the prior art, the method according to the present invention permits a reinforcing element to be fixed at a defined region of a blow-molded body. The configuration of such a reinforcing element is dependent upon the actual shape of the finished blow-molded body. Thus, such reinforcing elements may be flat and elongated as well as oval, round, or otherwise configured elements. One of the important facts to be considered in the selection of the reinforcing element and its configuration is that its surface provides a corresponding counterforce to the external pressure that begins when the blow-mold halves are closed. This counterpressure contributes to the inventive reduction of the wall cross section of the preform in these regions.

With this external pressure, the thermoplastic material of the walls of the preform is pressed into the cavity remaining in the body being molded. This means that the reinforcing element does not take up the entire interior of the preform; instead, some space in the interior remains after the reinforcing element has been inserted and even after the blow-molded body has been shaped. Such space is necessary to permit circulation of the blowing air in the interior of the blow-molded body during the molding process in spite of the insertion of reinforcing elements.

The blowing pressure applied in the remaining space of the preform influences the direction of flow of the plastic material displaced by the external pressure. This means that the displaced material does not enter into the remaining space of the blow-molded body in an unqualified manner, but is directed by the applied blowing pressure to the exposed edge regions of the reinforcing element and is pressed on there.

For this process it is desirable for the interior of the preform to be charged with a blowing pressure at least at the moment when the external pressure begins. This is important because in this way the direction of flow of the thermoplastic material pressed toward the exposed edge regions of the reinforcing element is predetermined right at the beginning of the pressing process.

In an advantageous modification of the method according to the invention, the exposed edge regions of the reinforcing element are covered by thermoplastic material over their entire surface area. This causes web-like bridges to be built between the inner walls of the blow-molded body, and the shapes of these bridges are maintained until the blow-molding process is completed. Thus, the web-like bridges provide an additional reinforcement for the blow-molded body, beyond merely holding the reinforcing element in the interior of the blow-molded body. Such an additional reinforcement offers advantages for blow-molded bodies subjected to great stresses, e.g. those employed in automobiles, athletic equipment, etc.

In addition to further reinforcement due to the formation of web-like bridges, additional bridges may be formed between the inner walls of the blow-molded body by way of passages of any desired shape in the reinforcing elements themselves. Such passages may, for example, be bores or punched-out holes of the most varied shapes. For example, round or other shapes of passages, slits, annular openings, etc. may be employed. All of these measures serve to increase the resistance of blow-molded bodies equipped in this manner to externally applied forces.

All polymer materials are conceivable as starting materials for the production of the blow-molded bodies according to the invention. Compact, foamed or hollow inserts of wood, metal, plastic, paper, cardboard, fiber-reinforced elements, etc. can be used as reinforcing elements. Such a reinforcing element may be arranged with or without passages at a particularly stressed location of a blow-molded body. If the blow-molded bodies are elongated, it is recommended to provide a plurality of such reinforcing elements one behind the other in the interior. Appropriate spacers may then hold the individual reinforcing elements at a predetermined distance from one another in the interior of the blow-molded body. Such spacers, which may, for example, be provided in the shape of metal or plastic rods, remain in the interior of the finished blow-molded body at the end of the blow-molding process without interfering in any way with the positive reinforcing effect produced by the method according to the invention. It is merely necessary for the cross-sectional area of the spacers to be equal to or less than the cross-sectional area of the reinforcing elements.

The reinforcing element or elements may be introduced into the preform by means of a longitudinally displaceable holding device. In this connection, it has been found to be optimum for the blow needle through which the blowing pressure is introduced into the interior of the preform to simultaneously act as the carrier of the reinforcing element or elements. In that case, of course, the blow opening should not be disposed at the tip of the blow needle but must be placed somewhere away from the tip in the region of the blow needle where it still remains in the interior of the preform after the blow-mold halves are closed.

In addition to easily fixing the reinforcing elements by guiding the thermoplastic material displaced into the interior of the blow-molded body by the external pressure around the edges of the reinforcing elements by means of the counteracting blowing pressure, the method according to the present invention has as a particular advantage that it makes it possible to form bridges between the interior wall of the blow-molded body. In this way, the blow-molded bodies can be given stronger reinforcements in particularly stressed zones in addition to the reinforcement of the blow-molded body by the introduction of the reinforcing element.

DESCRIPTION OF THE PREFERRED EMBODIMENTS

Figure 1:
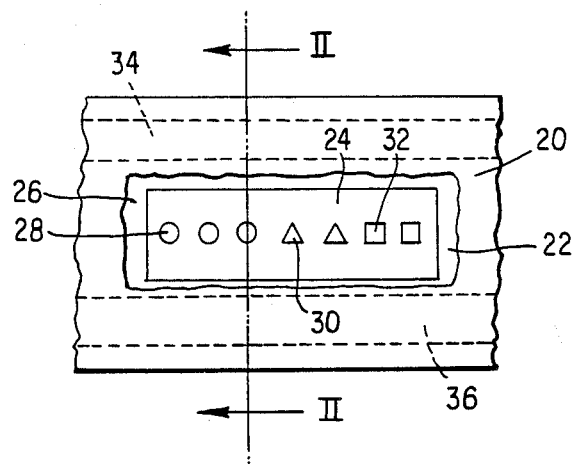
FIG. 1 is a top view, partially broken away, illustrating an example of a blow-molded body having an internal reinforcing element with passages.

FIG. 1 depicts a portion of a blow-molded body 20 with a region 22 broken away to expose a reinforcing element 24. Reinforcing element 24 is enclosed on all sides by the thermoplastic material 26 of the wall of blow-molded body 20. Passages 28, 30, and 32 of various configurations are provided in the reinforcing element 24.

Figure 2:
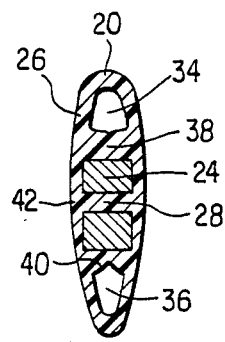
FIG. 2 is a cross-sectional view taken along line II—II of FIG. 1.

FIG. 2 depicts a cross-sectional view of blow-molded body 20 taken along line II—II of FIG. 1. This cross-sectional view shows that a passage 28 is filled with the thermoplastic material of the walls of blow-molded body 20. It can also be seen that thermoplastic material 26 has been pressed into cavities 34 and 36 along the top and bottom sides of reinforcing element 24, thus forming web-like bridges 38 and 40. In addition to these two bridges, a further bridge 42 of material has been produced through passage 28. These bridges of material are connected in one piece with the associated wall regions of blow-molded body 20.

FIG. 2 further shows that the wall regions of blow-molded body 20 in the region of reinforcing element 24 are thinner than the wall regions opposite cavities 34 and 36. The thermoplastic material pressed from the former wall regions in accordance with the method of the invention has been used to form the bridges 38, 40, and 42. As will be described in more detail below, the blowing pressure applied in the interior of cavities 34 and 36 in addition to an external pressure has caused the pressed-in material to be placed against the top and bottom sides of the reinforcing element. In this application the term "external pressure" refers to an inwardly directed pressure, in contrast to the outwardly directed pressure which is normally encountered in blow molding when compressed air is used to inflate a preform inside a mold. In particular, as will be described in more detail below, external pressure can be applied to a preform by closing a mold to squeeze a preform against outer surfaces of a reinforcing element.

Figure 3:
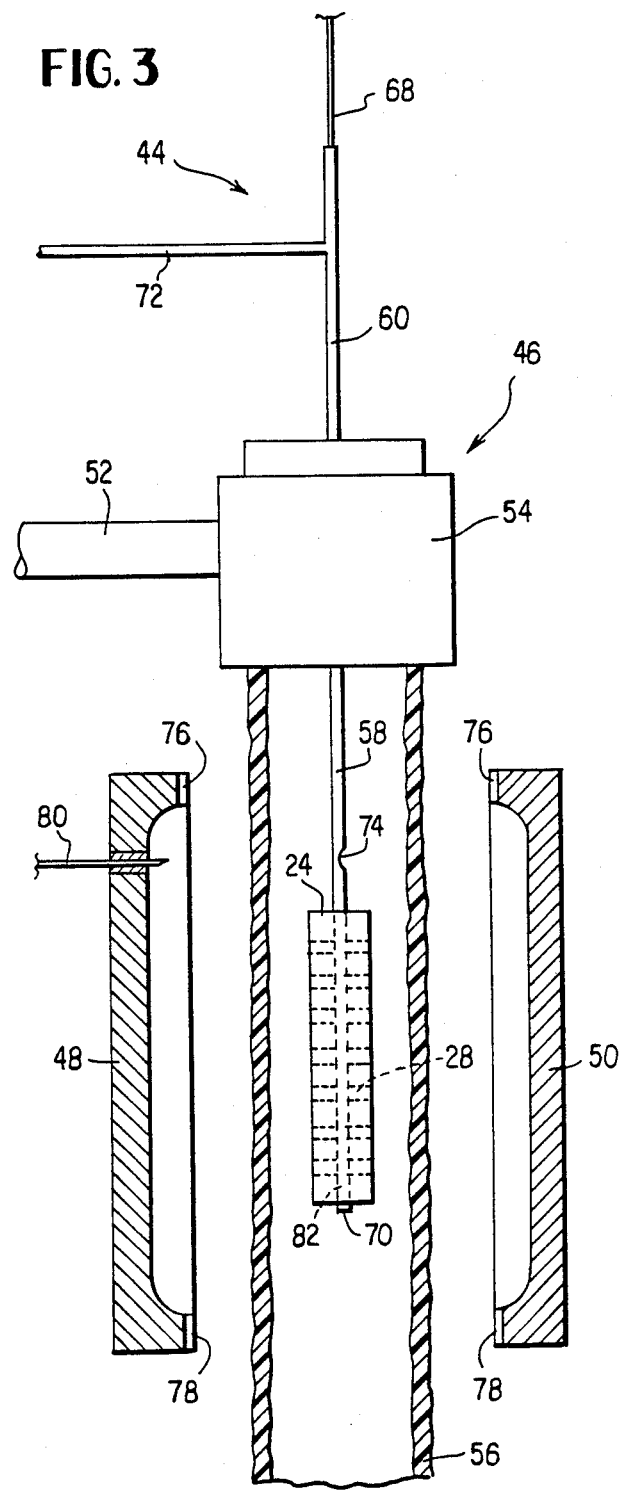
FIG. 3 is a side view, partially in section, illustrating an apparatus for making the blow-molded body of FIG. 1, the apparatus being shown during an initial stage of the process.

FIG. 3 schematically illustrates an apparatus 44 for making the blow-molded body 20. Apparatus 44 includes an extruder 46 and mold-halves 48 and 50. Extruder 46 includes an inlet conduit 52 by which plastic pellets (not illustrated) are fed to an extrusion head 54, which extrudes a tubular preform 56 of hot plastic. A holding device 58 for the reinforcing element 24 extends through extrusion head 54.

Figure 4:
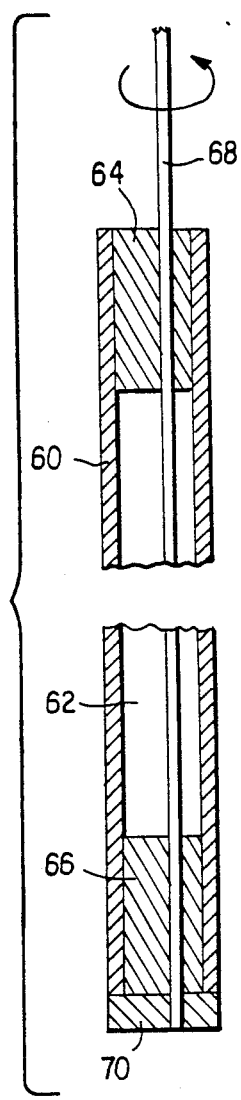
FIG. 4 is a sectional view, partially broken away, illustrating portions of a displacable holding device shown in FIG. 3.

Turning next to FIG. 4, holding device 58 includes a tube 60 having an interior 62 which is closed off by a top plug 64 and a bottom plug 66. Plugs 64 and 66 have eccentric bores through which rod 68 rotatably extends. A latch disk 70 has an eccentric bore which receives the bottom end of rod 68. Latch disk 70 is affixed to rod 68. In the position shown in FIG. 4, latch disk 70 is aligned with tube 60. However, if rod 68 is rotated by 180°, it will be apparent that latch disk 70 will be moved to a non-aligned position.

Returning to FIG. 3, tube 60 can be raised and lowered through extrusion head 54. Moreover, holding device 58 includes a tube 72 which is welded to tube 60 and which communicates with the interior 62 of tube 60. Tube 72 is able to receive pressurized air, which exits via blow opening 74 in tube 60.

Mold halves 48 and 50 have upper regions 76 which, when the mold is closed, define an upper opening into the interior of the mold. Mold halves 48 and 50 also have lower regions 78 which, when the mold is closed, define a lower opening into the interior of the mold. A blowing pin 80 extends through the wall of mold half 48.

Reinforcing element 24 has a bore 82 which extends through the passages 28, 30, and 32 (see FIG. 1).

To make a blow-molded body 20 (see FIG. 1), mold halves 48 and 50 are moved to the open position as shown in FIG. 3 and a reinforcing element 24 is first mounted on the holding device 58. This is accomplished by rotating latch disk 70 to the aligned position, as shown in FIG. 4, and then inserting the lower end of tube 60 through the bore 82. Rod 68 is then rotated by 180° to shift latch disk 70 to the non-aligned position shown in FIG. 3. Thereafter preform 56 is extruded around reinforcing element 24. Mold halves 48 and 50 are then moved toward one another to start closing the mold.

Figure 5:
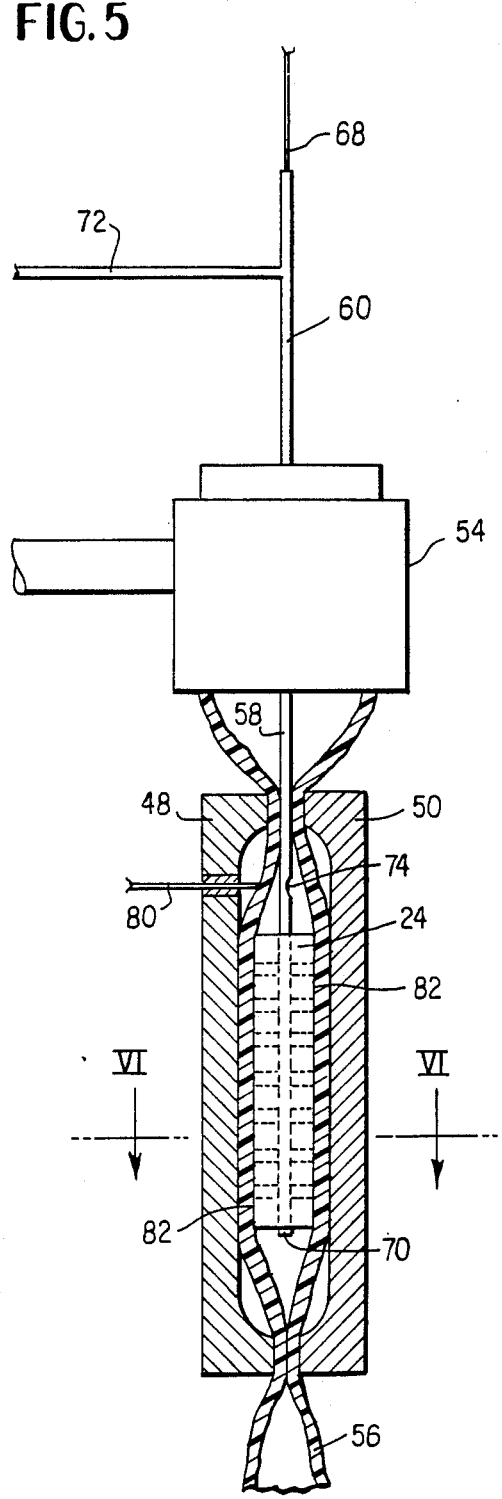
FIG. 5 is a side view, partially in section, illustrating the apparatus shown in FIG. 4 in a subsequent stage during production of a blow-molded body as shown in FIG. 1.

FIG. 5 illustrates an intermediate position wherein the mold is partially closed. In this intermediate position the preform 56 has just come into contact with both the interior surfaces of the mold and the outer surfaces of reinforcing element 24. At the bottom end of the mold, preform 56 has been sealed off and, at the top end of the mold, the thermoplastic contacts tube 60. However, as will be seen in FIG. 6 (which omits rod 68 due to the reduced size of the drawing), the mold is still not completely closed.

When the mold reaches the intermediate position shown in FIG. 5, compressed air is delivered to the sealed-off preform 56 through blow opening 74. This presses the thermoplastic within the mold outward, and blowing pin 80 pierces the wall of preform 56. Rod 68 is then rotated by 180° to shift latch disk 70 to the aligned position, whereupon holding device 58 is withdrawn from the mold. The mold is subsequently closed the rest of the way, and compressed air is injected via blowing pin 80 to make the outer surface of the thermoplastic conform to the inner surface of the closed mold.

Figure 6:
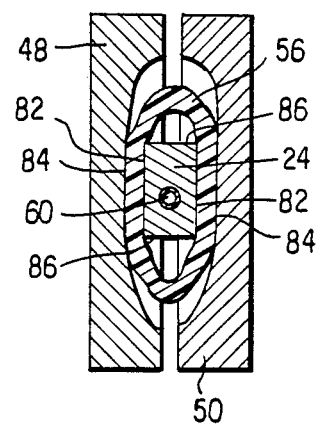
FIG. 6 is a sectional view taken along line VI—VI of FIG. 5.

In the intermediate position shown in FIG. 6, it will be apparent that excess thermoplastic is disposed between the surface regions 82 of the reinforcing element 24 and the adjacent surfaces 84 of the mold cavity. As the mold is closed further, the excess thermoplastic is squeezed into the passages 28, 30, and 32 (see FIG. 1) and around the surface regions 86 of the reinforcing element 24. This squeezed-out thermoplastic material forms the bridges 38, 40, and 42 shown in FIG. 2.

Figure 7:
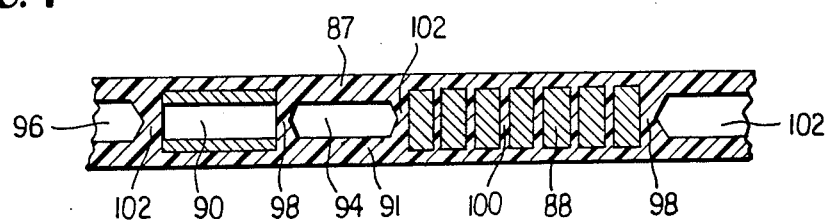
FIG. 7 is a sectional view, partially broken away, illustrating a different blow-molded body having a plurality of reinforcing elements.

FIG. 7 is a partial sectional view of an elongated blow-molded body 87 equipped with a plurality of reinforcing elements 88 and 90 arranged one behind the other and embedded in plastic 91. Reinforcing element 88 is provided with passages of the type described in connection with FIG. 1, while reinforcing element 90 has no such passages Spacers (not shown) may be introduced into cavities 92, 94, and 96 to hold reinforcing elements 88 and 90 and, if required, further reinforcing elements (not shown) in position during the blow-molding process. Reinforcing elements 88 and 90 are also fixed in the interior of the blow-molded body 1 in a particularly reinforcing manner by way of bridges 98, 100, and 102.

Figure 8:
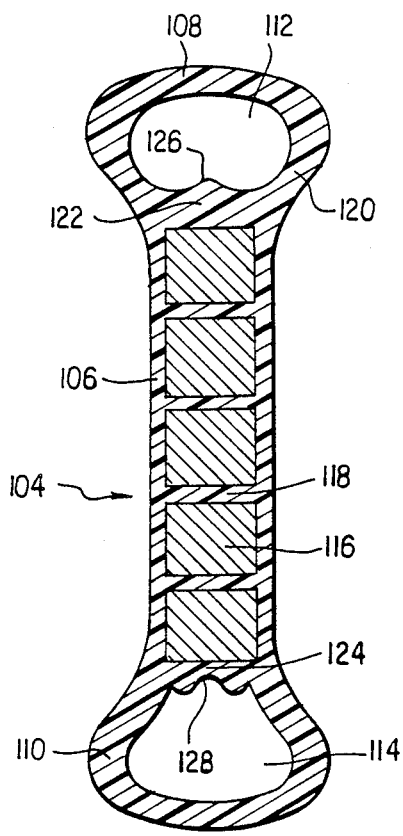
FIGS. 8–10 are cross-sectional view of further blow-molded bodies equipped with reinforcing elements.
Figure 9:
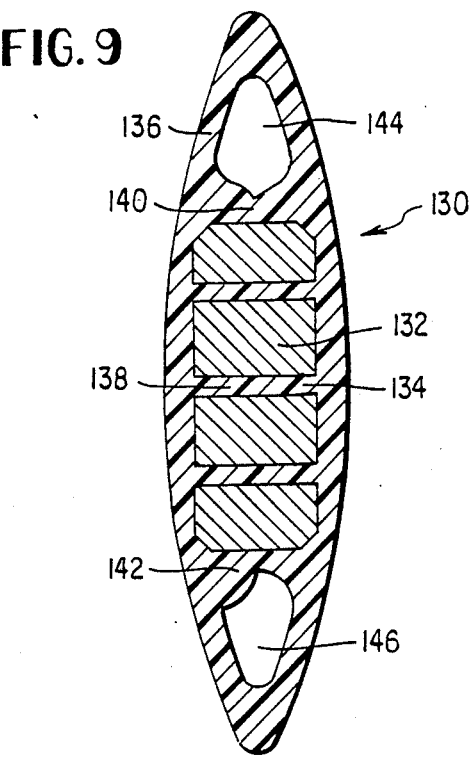
Figure 10:
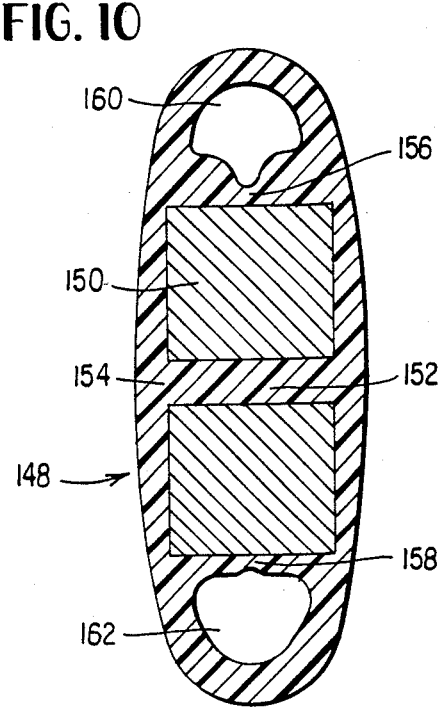
Figure 11A:
FIG. 11A is a top view of another reinforcing element, and FIG. IIB is a sectional view thereof.
Figure 11B:
Figure 12A:
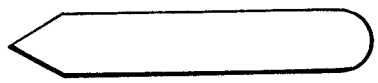
FIG. 12A is a top view of yet another reinforcing element.
Figure 12B:
FIG. 12B is a sectional view thereof.
Figure 13A:
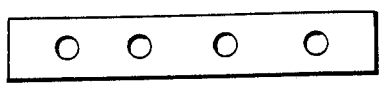
FIG. 13A is a top view of yet another reinforcing element.
Figure 13B:
FIG. 13B is a sectional view thereof.
Figure 14A:
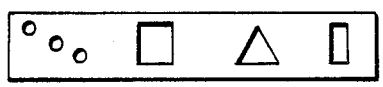
FIG. 14A is a top view of yet another reinforcing element.
Figure 14B:
FIG. 14B is a sectional view thereof.
Figure 15A:
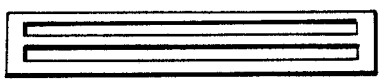
FIG. 15A is a top view of yet another reinforcing element.
Figure 15B:
FIG. 15B is a sectional view thereof.
Figure 16A:
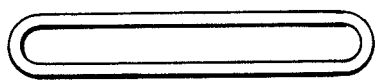
FIG. 16A is a top view of another reinforcing element.
Figure 16B:
FIG. 16B is a sectional view thereof.
Figure 17:
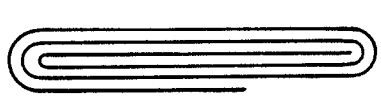
FIG. 17 is a top view of yet another reinforcingelement.

FIGS. 8–10 show various cross-sectional configurations of blow-molded bodies equipped with reinforcing elements.

FIG. 8 shows a blow-molded body 104 having an elongate center section 106 and bulb-like thickened portions 108 and 110 extending from center section 106. Cavities 112 and 114 are formed in the bulb-shaped thickened portions 108 and 110. Reinforcing element 116 is provided with passages 118. In these passages, the displacement of thermoplastic material from wall 120 has resulted in the formation of bridges between the walls of the blow-molded body 104. Web-like bridges 122 and 124 are also formed at the sides of the reinforcing element 116. The web-like bridge 122 includes a tip-like raised portion 126 deflected into cavity 112, while web-like bridge 124 has a wavy surface 128. These different configurations in the surface regions of web-like bridges 122 and 124 are produced during the meeting of the two pressure regions generated by the external pressure and the internal blowing pressure. The walls in these regions will not be smooth because the meeting of the thermoplastic masses which are caused to flow inwardly by the external pressure are initially placed against the exposed side regions of reinforcing element 116, whereupon the thermoplastic material continues to flow and is deflected into cavities 112 and 114. The blowing pressure existing therein is unable to prevent this.

The illustration in FIG. 8 clearly shows that the wall thicknesses of blow-molded body 104 in the regions of the bulb-like widened portions 108 ad 110 are greater than the wall thickness at the elongated center section 106. These differences in wall thickness are caused by displacement of thermoplastic material into the interior of blow-molded body 104 due to the external pressure.

FIG. 9 shows a different cross section of a blow-molded body 130 having what might be called a shuttle shape. A reinforcing element 132 having passages 134 is embedded in plastic 136. During the molding process, the plastic enters passages 134 to form bridges 138 and overlaps the sides of reinforcing element 132 to form bridges 140 and 142. Particularly noticeable are the surface configurations of bridges 140 and 142. In this case as well, the wall thickness of the blow-molded body 130 is greater in the region of cavities 144 and 146 than at reinforcing element 132.

FIG. 10 illustrates a blow-molded boy 148 having another cross-sectional configuration. Blow-molded body 148 includes a reinforcing element 150 having passages 152. Bridges 154, 156, and 158 are formed during the molding process, along with cavities 160 and 162.

FIGS. IIA, 12A, 13A, 14A, 15A, 16A, and 17 illustrate top views of possible variations for the reinforcing elements. It will be seen that these variations include simple board-like structures, contoured elements, elements provided with passages and slits, elements having annular and bar-like configurations, and bent wire structures. FIGS. 11B, 12B, 13B, 14B, 15B, and 16B correspond respectively to FIGS. 11A-16A, and illustrate cross-sectional views of the respective reinforcing elements. It will be seen that these cross-sections include elongated shapes, smooth shapes, rotund shapes, and angled shapes. Materials from which these reinforcing elements are made can be selected to meet the particular requirements of the blow-molded body.

Figure 18:
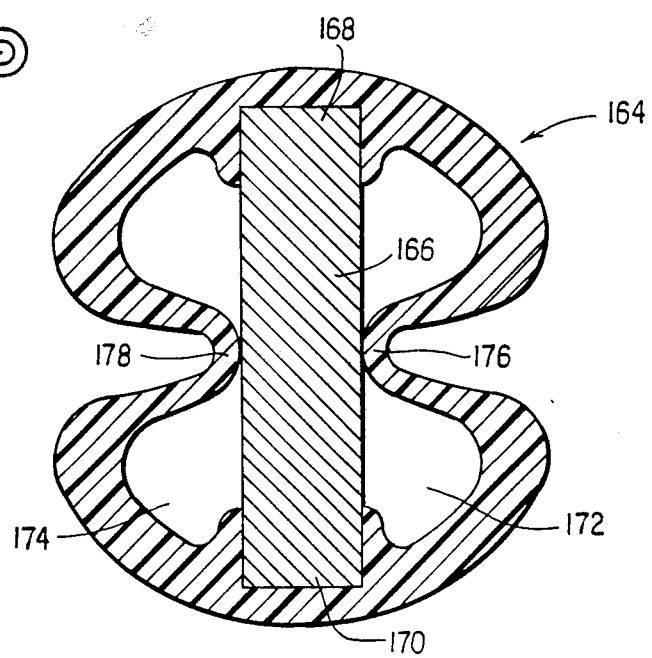
FIG. 18 is a sectional view through still another blow-molded body having a reinforcing element.

Finally, FIG. 18 shows an embodiment of the blow-molded body 164 produced according to the invention in which reinforcing element 166 is not enclosed by the thermoplastic material over its entire surface area. The blow-molded body 164 has a rotund shape in which the external pressure was utilized merely to cause material to flow around frontal wall regions 168 and 170 of reinforcing element 166.

Additional fastening of reinforcing element 16 in cavities 172 and 174 is realized by wall indentations 176 and 178 which were produced, for example, by conically raised portions on the blow-mold halves (not shown). Such wall indentations may be repeated at will over the length of this rotund blow-molded body.

The embodiment according to FIG. 18 also clearly shows that the walls of blow-molded body 164 lie lower in the region of the frontal faces 168 and 170 of reinforcing element 2 than in the wall regions of blow-molded body 1 outside of these zones.

The present disclosure relates to the subject matter disclosed in Federal Republic of Germany patent application No. P 37 30 488.7 of Sept. 11, 1987, the entire disclosure of which is incorporated herein by reference.

It will be understood that the above description of the present invention is susceptible to various modifications, changes, and adaptations, and the same are intended to be comprehended within the meaning and range of equivalents of the appended claims.

What I claim is:

1. A method of producing a blow-molded body using a mold having a pair of mold portions which are movable between an open position and a closed position to respectively open and close the mold, there being a gap between the mold portions when the mold is open, said method comprising the steps of:
    (a) with the mold open, supporting a reinforcing element between the mold portions, the reinforcing element having a pair of first surface regions directed toward the mold portions and a pair of second surface regions directed toward the gap, the reinforcing element additionally having passages which open onto the first surface regions;
    (b) with the mold open, positioning at least one preform of thermoplastic material between the mold portions and the reinforcing element; and
    (c) forming the blow-molded body by closing the mold and inflating the at least one preform within the mold by means of a pressurized gas, thermoplastic material of the preform being compressed by the closing mold between the first surface regions and the mold portions and being squeezed into the passages and onto the second surface regions due to the compression, the thermoplastic material squeezed onto the second surface regions additionally being pressed against the second surface regions by the pressurized gas, the thermoplastic material that is squeezed onto and pressed against the second surface regions forming bridges across the second surface regions.

* * * * *